(12) United States Patent
Gumaer

(10) Patent No.: US 9,888,115 B2
(45) Date of Patent: Feb. 6, 2018

(54) MEDIA DEVICE AND METHOD OF USING A MEDIA DEVICE

(71) Applicant: Lennard A. Gumaer, Bloomfield Hills, MI (US)

(72) Inventor: Lennard A. Gumaer, Bloomfield Hills, MI (US)

(*) Notice: Subject to any disclaimer, the term of this patent is extended or adjusted under 35 U.S.C. 154(b) by 744 days.

(21) Appl. No.: 14/193,438

(22) Filed: Feb. 28, 2014

(65) Prior Publication Data

US 2014/0241213 A1     Aug. 28, 2014

Related U.S. Application Data

(60) Provisional application No. 61/770,631, filed on Feb. 28, 2013, provisional application No. 61/770,680, filed on Feb. 28, 2013.

(51) Int. Cl.
*H04M 1/64* (2006.01)
*H04M 3/428* (2006.01)
*H04M 3/42* (2006.01)

(52) U.S. Cl.
CPC ...... *H04M 3/4285* (2013.01); *H04M 3/42161* (2013.01)

(58) Field of Classification Search
CPC ........... H04M 3/42153; H04M 3/4285; H04M 3/42017
USPC ......................................... 379/67.1; 370/259
See application file for complete search history.

(56) References Cited

U.S. PATENT DOCUMENTS

| | | |
|---|---|---|
| 3,808,372 A | 4/1974 | Sielsch |
| 4,602,127 A | 7/1986 | Neely et al. |
| 4,623,762 A | 11/1986 | Boeckmann et al. |
| 4,674,118 A | 6/1987 | Tosto |
| 4,726,051 A | 2/1988 | Schuermann |
| 4,807,275 A | 2/1989 | Enstrom |
| 4,834,551 A | 5/1989 | Katz |
| 4,856,050 A | 8/1989 | Theis et al. |
| 4,860,338 A | 8/1989 | Waldman |
| 4,866,754 A | 9/1989 | Hashimoto |
| 4,899,381 A | 2/1990 | Lee |
| 4,982,420 A | 1/1991 | Theis |
| 5,003,587 A | 3/1991 | Forbes |
| 5,081,672 A | 1/1992 | Mita et al. |
| 5,131,031 A | 7/1992 | Waldman |
| 5,410,593 A | 4/1995 | Kamota |
| 5,425,079 A | 6/1995 | Noda et al. |
| 5,444,768 A | 8/1995 | Lemaire et al. |

(Continued)

FOREIGN PATENT DOCUMENTS

WO          9720421 A1     6/1997

*Primary Examiner* — Van D Huynh

(57) ABSTRACT

A media player for providing media content to telephone systems for audible interaction with a caller on-hold with the telephone system, and a method of programming, using, and operating the media player. The media player includes a controller configured to construct a playlist based on a directory having at least two files of media content. The controller is further configured to create an order of execution for the playlist based on a unique identifier name of each of the at least two files of media content and switches at least two files of media content after a predetermine amount of the. The media content may be one of a greeting, a priority announcement, a voice announcement, a music selection, and a sound effect selection.

33 Claims, 7 Drawing Sheets

(56) References Cited

U.S. PATENT DOCUMENTS

| | | |
|---|---|---|
| 5,594,783 A | 1/1997 | Ito |
| 5,671,268 A | 9/1997 | Flipeaux |
| 5,822,403 A | 10/1998 | Rowan |
| 5,854,826 A | 12/1998 | Kim |
| 5,875,231 A | 2/1999 | Farfan |
| 6,122,346 A | 9/2000 | Grossman |
| 6,157,713 A | 12/2000 | Wu |
| 6,324,261 B1 | 11/2001 | Merte |
| 6,332,018 B1 | 12/2001 | Dan |
| 6,400,804 B1 | 6/2002 | Bilder |
| 6,510,207 B1 | 1/2003 | Cannon |
| 6,597,779 B1 | 7/2003 | Wilk |
| 6,600,813 B1 | 7/2003 | Nakai |
| 6,668,044 B1 | 12/2003 | Schwartz et al. |
| 6,690,776 B1 | 2/2004 | Raasch |
| 6,694,012 B1 | 2/2004 | Posthuma |
| 6,751,212 B1 | 6/2004 | Kaji et al. |
| 6,760,410 B1 | 7/2004 | Lee |
| 6,763,090 B2 | 7/2004 | Che |
| 6,768,722 B1 | 7/2004 | Katseff et al. |
| 6,778,639 B2 | 8/2004 | Gusler et al. |
| 6,885,732 B2 | 4/2005 | Fellenstein et al. |
| 6,937,700 B1 | 8/2005 | Jang |
| 6,947,526 B2 | 9/2005 | Wilson |
| 6,947,728 B2 | 9/2005 | Tagawa et al. |
| 6,959,071 B2 | 10/2005 | Fujisawa |
| 7,085,263 B1 | 8/2006 | Fitzgerald |
| 7,092,494 B1 | 8/2006 | Anders et al. |
| 7,136,479 B2 | 11/2006 | Gutta et al. |
| 7,164,752 B1 | 1/2007 | Obilisetty |
| 7,197,130 B2 | 3/2007 | Paden et al. |
| 7,242,751 B2 | 7/2007 | Bushey et al. |
| 7,330,536 B2 | 2/2008 | Claudatos et al. |
| 7,356,475 B2 | 4/2008 | Novack et al. |
| 7,359,491 B2 | 4/2008 | Liu et al. |
| 7,421,065 B2 | 9/2008 | Kato et al. |
| 7,450,698 B2 | 11/2008 | Bushey et al. |
| 7,453,991 B1 | 11/2008 | Hirschberg et al. |
| 7,460,652 B2 | 12/2008 | Chang |
| 7,502,448 B1 | 3/2009 | Elman et al. |
| 7,548,609 B2 | 6/2009 | Rao et al. |
| 7,577,664 B2 | 8/2009 | Malik |
| 7,580,837 B2 | 8/2009 | Bushey et al. |
| 7,602,898 B2 | 10/2009 | Klein et al. |
| 7,627,096 B2 | 12/2009 | Bushey et al. |
| 7,627,109 B2 | 12/2009 | Mitra |
| 7,636,432 B2 | 12/2009 | Bushey et al. |
| 7,657,005 B2 | 2/2010 | Chang |
| 7,664,235 B2 | 2/2010 | Hirschberg et al. |
| 7,668,889 B2 | 2/2010 | Edwards et al. |
| 7,720,203 B2 | 5/2010 | Bushey et al. |
| 7,724,889 B2 | 5/2010 | Bushey et al. |
| 7,751,551 B2 | 7/2010 | Bushey et al. |
| 7,769,142 B2 | 8/2010 | Selbie et al. |
| 7,773,730 B1 | 8/2010 | Kittrell et al. |
| 7,813,480 B2 | 10/2010 | Takahashi |
| 7,813,481 B1 | 10/2010 | Hursey et al. |
| 7,835,503 B2 | 11/2010 | Jindal |
| 7,864,942 B2 | 1/2011 | Knott |
| 7,889,858 B2 | 2/2011 | Hamilton, II et al. |
| 7,933,389 B2 | 4/2011 | Kumar et al. |
| 7,933,399 B2 | 4/2011 | Knott et al. |
| 7,936,861 B2 | 5/2011 | Knott et al. |
| 7,949,103 B2 | 5/2011 | Sapp et al. |
| 7,965,821 B2 | 6/2011 | Bouchard et al. |
| 7,966,176 B2 | 6/2011 | Bushey et al. |
| 7,974,390 B2 | 7/2011 | Vogel, Jr. et al. |
| 7,986,776 B2 | 7/2011 | Hamilton, II et al. |
| 7,995,710 B2 | 8/2011 | Sato et al. |
| 7,995,711 B2 | 8/2011 | Hirschberg et al. |
| 8,005,204 B2 | 8/2011 | Bushey et al. |
| 8,036,373 B2 | 10/2011 | Shaffer et al. |
| 8,068,596 B2 | 11/2011 | Mitra |
| 8,073,430 B1 | 12/2011 | Harris |
| 8,090,086 B2 | 1/2012 | Chang |
| 8,102,992 B2 | 1/2012 | Paden et al. |
| 8,107,600 B1 | 1/2012 | O'Keeffe |
| 8,130,913 B1 | 3/2012 | Panchbudhe et al. |
| 8,130,936 B2 | 3/2012 | Kortum et al. |
| 8,144,837 B2 | 3/2012 | Guedalia et al. |
| 8,165,281 B2 | 4/2012 | Joseph et al. |
| 8,175,253 B2 | 5/2012 | Knott et al. |
| 8,223,954 B2 | 7/2012 | Dallessandro et al. |
| 8,229,078 B2 | 7/2012 | Wright et al. |
| 8,249,223 B2 | 8/2012 | Fujimoto et al. |
| 8,280,030 B2 | 10/2012 | Bushey et al. |
| 8,284,907 B2 | 10/2012 | Elman et al. |
| 8,284,927 B1 | 10/2012 | Chu et al. |
| 8,290,124 B2 | 10/2012 | Mikan et al. |
| 8,295,469 B2 | 10/2012 | Bushey et al. |
| 8,306,192 B2 | 11/2012 | Bushey et al. |
| 8,321,446 B2 | 11/2012 | Edwards et al. |
| 8,345,828 B2 | 1/2013 | Williams et al. |
| 8,369,489 B2 | 2/2013 | Mock et al. |
| 8,428,227 B2 | 4/2013 | Angel et al. |
| 8,467,501 B2 | 6/2013 | Litteaut et al. |
| 8,488,749 B2 | 7/2013 | Mikan et al. |
| 8,605,865 B2 | 12/2013 | Wright et al. |
| 2002/0159570 A1 | 10/2002 | Langsenkamp |
| 2003/0091161 A1 | 5/2003 | Tuominen |
| 2003/0103604 A1 | 6/2003 | Kato et al. |
| 2003/0118158 A1 | 6/2003 | Hattori |
| 2003/0133542 A1 | 7/2003 | Takaashi et al. |
| 2003/0147509 A1 | 8/2003 | LaVelle |
| 2003/0179861 A1 | 9/2003 | Miyoshi et al. |
| 2004/0022371 A1 | 2/2004 | Kovales et al. |
| 2004/0028193 A1 | 2/2004 | Kim |
| 2004/0081292 A1 | 4/2004 | Brown et al. |
| 2004/0131161 A1 | 7/2004 | Schwartz et al. |
| 2004/0176079 A1 | 9/2004 | Fratti |
| 2005/0100138 A1 | 5/2005 | Abraham |
| 2005/0100139 A1 | 5/2005 | Morse et al. |
| 2005/0190899 A1* | 9/2005 | Rhodes, Jr. ............. H04L 12/66 379/101.01 |
| 2005/0207542 A1 | 9/2005 | Carroll et al. |
| 2005/0220279 A1 | 10/2005 | Schipper et al. |
| 2007/0004384 A1 | 1/2007 | Anupam |
| 2007/0041357 A1 | 2/2007 | Hoffman et al. |
| 2007/0116199 A1 | 5/2007 | Arrasvuori et al. |
| 2007/0121811 A1 | 5/2007 | Ying et al. |
| 2008/0123822 A1 | 5/2008 | Sapp et al. |
| 2008/0181391 A1 | 7/2008 | Fujiwara |
| 2008/0212747 A1 | 9/2008 | Weissman |
| 2008/0279346 A1 | 11/2008 | Ezumi |
| 2009/0003536 A1 | 1/2009 | Katis et al. |
| 2009/0003537 A1 | 1/2009 | Katis et al. |
| 2009/0129564 A1 | 5/2009 | Sung et al. |
| 2009/0175423 A1 | 7/2009 | Portman et al. |
| 2009/0257565 A1 | 10/2009 | Nelson et al. |
| 2010/0094880 A1* | 4/2010 | Rogers ............. G06F 17/30053 707/752 |
| 2010/0150320 A1 | 6/2010 | Lingafelt et al. |
| 2010/0232579 A1 | 9/2010 | Hearn |
| 2010/0284667 A1* | 11/2010 | Yahata ................ G11B 27/034 386/241 |
| 2010/0332555 A1* | 12/2010 | Mitsugi ................ G11B 27/105 707/803 |
| 2012/0207448 A1* | 8/2012 | Hama ..................... H04N 5/76 386/241 |
| 2012/0290621 A1* | 11/2012 | Heitz, III .......... G06F 17/30743 707/780 |
| 2013/0070915 A1* | 3/2013 | Kanter ................ H04M 3/4285 379/93.01 |
| 2013/0301812 A1 | 11/2013 | Bakker et al. |
| 2016/0246798 A1* | 8/2016 | Beaupre ............ G06F 17/30056 |

* cited by examiner

MEDIA DEVICE AND METHOD OF USING A MEDIA DEVICE

CROSS-REFERENCE TO PRIOR APPLICATION

This U.S. patent application claims the benefit of U.S. Provisional Patent Application Ser. Nos. 61/770,631 and 61/770,680 filed Feb. 28, 2013, entitled "Media Device and Method of Using Media Device," the entire disclosures of the applications being considered part of the disclosure of this application and hereby incorporated by reference.

FIELD OF THE INVENTION

The present invention is directed to a media player and to a method of using a media player. More specifically, the present invention is directed to a media player capable of being integrated into telephone systems to provide various forms of media content to callers on-hold, including music and announcements, and the capability to easily insert, delete or change various announcements or other media files including the ability to arrange the order of music and announcements, as well as to a method of programming and using the media player.

BACKGROUND OF THE INVENTION

Since the invention of the telephone in the late 1800s, telephone systems have been one of the most used and relied on systems for personal and business communications between individuals. Since the telephones conception, technology surrounding telephone systems has rapidly progressed from telephone landlines to cellular phones and hosted soft phones. As such, a telephone system for a business may have analog, digital, or Voice over Internet Protocol (VoIP) capabilities or a combination thereof. As this technology progresses, the world is increasingly becoming more connected and more individuals, businesses, organizations, and other entities are looking to their telephone systems as a way to provide marketing and helpful announcements beyond the generic hold messages and music. The ability to provide near universal devices and software to provide on-hold content has become increasingly difficult and expensive as more individuals carry cell phones and more businesses, organizations or other entities utilize either cell phones or landlines with different communication capabilities or protocols to conduct their personal and business communications.

A continual need to place calls on-hold exists for businesses and entities as well as individuals. Examples of reasons to place a caller on-hold include, but are not limited to, a temporary excess volume of calls, a need to confer with others, a need to research information pertaining to the call discussion, a need to answer another call, a need to reroute the call to the correct individual, or simply a need to perform an action and/or a function remote from the telephone. The use of a hold function with telephone systems is common with private businesses, organizations, or other entities such as offices with a receptionist or an auto attendant, government agencies, fire departments, police departments, and other municipal departments with telephone systems on the premises, which manage inbound and outbound telephone circuits, provide voice storage for their staff, and route inbound and outbound calls.

In placing a call on-hold, the telephone system typically requires the call to maintain an "off-hook" status. An off-hook status exists when the telephone line is in use regardless of whether there is an active voice conversation occurring. The off-hook status is indicated by maintaining a certain load impedance on an analog telephone circuit, or maintaining a certain signaling or call station condition on a digital or VoIP circuit. During the time the caller is placed on-hold and an off-hook status is maintained, no human audible signal or sound is present within the telephone system. As a result, the party(s) remaining on and listening to the on-hold call hear silence or incidental background noise, such as static or white noise, emanating from the telephone system, or network until the call resumes. Most individuals, organizations, businesses, and other entities do not like the silence while a call is on-hold and callers typically find silence undesirable, annoying, and longer than some form of distraction, such as music or announcement. In addition, callers are more likely to hang up during a silent hold than when music or messages are playing and callers consistently overestimate the amount of time spent on-hold when the call is silent.

Another issue with silent on-hold calls is that unless the caller or the "on-hold" party is particularly observant, it is difficult to ascertain if the call is remaining in an "on-hold" status, if some technical fault has occurred, or an operator error has caused the call to be terminated. This is especially common with technical peculiarities specific to calls originating or terminating in VoIP or cellular telephone apparatuses and systems. As such, individuals, businesses, organizations, and other entities continue to desire to keep the caller on-hold engaged and certain that they are still on-hold and not disconnected. Beyond music, the time the caller spends on-hold may be harnessed to market products, services, or provide informative announcements.

Most large corporations or organizations with sufficient budgets for complex telephone systems provide a human-audible signal through the telephone system while a call is on-hold, so that listening party(s) hear something other than silence until the call resumes. The most common form of human-audible signal is a periodic sequence of audio tones, music, or a combination of music and spoken voice announcements. Many large businesses use the on-hold time to market products and services to the caller. Many other organizations or entities provide music to pass the time, which may be interspersed, mixed, or layered with various announcements. Currently, the systems required to provide mixed or layered messages with current content and announcement are complex and expensive, and as such are not affordable or feasible for many small businesses, organizations, and public entities to use. Therefore, while many public institutions, such as public safety entities, desire to use the on-hold time to provide educational announcements to callers regarding fire prevention, crime prevention, safety, and other public service announcements, most institutions generally do not have the budget, expertise or in-house capabilities for programming, using, and maintaining such a system. Moreover, while some municipalities may provide generic non-dated announcements, such as hours of the offices of the municipality, they are not able to easily provide information that changes regularly such as information about current events, or even changes to the hours of operation, like summer or holiday hours. As such, most systems, as described below, are set to provide a single audio loop that never changes. This is particularly problematic since many systems start the audio loop at the same spot each time a caller is placed on-hold. In addition, repeat callers may become annoyed listening to the same audio each time the callers are placed on-hold.

Existing telephone switching apparatuses and systems in the marketplace are capable of internally generating periodic tones, or providing an analog audio signal input connection so that an external device may be connected to supply the on-hold signaling. Most of these systems pipe in music through the telephone system when a caller is on-hold by utilizing a feed of a local radio stations, vinyl record players, analog reel-to-reel, or cassette audio tape players. However, these systems generally do not allow timely interspaced announcements and also have been discouraged due to various legal issues, copyright issues, mechanical unreliability, and magnetic media wear issues. As a result, manufacturers have created and marketed devices with improved media including Compact Disc, DVD optical media, semiconductor memory, and removable USB storage mediums; however, these systems do not solve many of the problems identified above. While some of these devices permit changes to the stored audio program(s) by means of removable memory, USB storage mediums, or connection to a modem or network, the creation of the audio file and the programming of the system is complex and difficult. Some systems even require the manufacturer to customize the audio programs for the individuals, business, organization, or other entity, which is very expensive over time. For the above devices, the configurations may include (1) a device or system in which the manufacturer, seller or service provider, authors or edits announcement scripts, provides voice and musical talent, produces, records, and edits the audio program on a rental, recurring, or one-time purchase basis, or (2) as a standalone device where the end-user produces their own audio programming and uploads it to the device in analog or digital form via a storage medium or a computer interface. In the aforementioned cases, the audio player device is very simple, and concerns itself merely with playing back the single audio program as it was previously prepared external to itself by the end user or the creative solution manufacturer. Any changes to a single announcement, adding, or deleting an announcement requires revising externally and replacing the whole audio file on the storage medium of choice.

The abovementioned existing solutions may be adequate for an end user desiring a simple musical selection to which they obtained the proper legal rights to play for callers, in a loop, or where a combined voice announcement and background music program may be created once and if the operator of the system does not require or does not desire to change the audio recording. However, the above system is not suitable for an end user who desires to change the audio file or add announcement now or in the future. For example, consider an on-hold audio program that consists of a single musical selection of 4 minutes length, and 3 voice announcements consisting of a greeting/identification, and several marketing announcements as follows:

[REF1] Voice announcement 1: "Thank you for calling our company. Your call is important to us, and we will return to the line shortly."
  [REF2] Voice announcement 2: "Our spring product line will be introduced March first. Please visit our showroom to learn about our new products."
  [REF3] Voice announcement 3: "Would you like more information about our product X? Please ask our representative when they return to the call."

In using the above exemplary announcements, a typical program, recorded as a single audio file for existing systems would begin with a music selection or with an initial greeting such as [REF 1] playing at full volume or fading up to full volume. Music would then play for an arbitrary time duration at full volume as desired by the operator the telephone system, followed by the music amplitude fading out to a background level and the greeting/identification announcement playing one of the above [REF1]-[REF3], followed by the music amplitude fading back to full volume. After an additional arbitrary time duration, the music fades down to a background level and another one of the above announcements [REF1]-[REF3] after which music fades back in, and an additional arbitrary duration of music playing passes, the music fades out, and the cycle of music and providing an announcement is repeated in a loop. The cycle of music, announcement, or a combination thereof continues until the hold status ends. The total length of the above exemplary audio program may vary with music and voice content layered on one another, however, to make any changes to the announcement or add an announcement requires the creation of a new single audio file including the background music.

An exemplary prerecorded audio program or file as described above is expected to be uploaded or stored in the audio playback device as a single file, and the device typically plays the audio program file back continuously in a loop. The audio output of the playback device would be connected to the audio program input on the telephone system, and thus calls placed in an on-hold status would be connected to the audio program, which by design would rarely change.

The examples of systems and devices described above are extremely costly to the end user and require considerable audio production skills and professional audio recording equipment to produce the audio program which is uploaded as a single file. As such, most systems are out of reach for most entities and organizations, and the system all but eliminates the ability to provide current, timely announcements. More specifically, current systems require specialized skills to create, meld, and render the program into a single file of music and announcements in a format that existing audio playback devices support, and to install the program in the playback device. These skills and the required equipment are out of the reach to all but the largest corporations and organizations, unless the business pays expensive rental fees for the equipment and expensive service fees to a service provider to record and update messages. Therefore, for most businesses, organizations, and entities, these systems are not configured to or are cost prohibitive in providing updated timely announcements while callers are on-hold.

As more businesses and public institutions desire to tailor their on-hold time and use it to market products and services to the callers and provide timely announcements, particularly to existing customers and people in the community, a desire exists for an easy to use, simple, and cost effective solution. Additionally, the mixing/layering of music and voice content may cause the voice content to be difficult to hear, unless specialized steps are taken. The different communication configurations or protocols used in conjunction with the mixing/layering of music and voice content may also result in undesirable noise such as pops, clicks, and garbling when the music and voice content is played simultaneously. Therefore, there is a need for a simplified device or system that allows end users to make frequent changes to the program, has reduced costs of maintaining and creating audio content, does not require expensive monthly fees, does not require specialized skills and expertise in programming or formulating of audio content, provides seamless music and voice content mixing without undesirable noise, and may be integrated into any telephone system regardless of the telephone business or organization's system protocol, i.e., analog, digital, or VoIP.

SUMMARY OF THE INVENTION

The present invention is directed to a media player or system and to a method of using a media player. More specifically, the present invention is directed to a media player capable of being integrated into telephone systems to provide various forms of media content to callers on-hold, including music and announcements, and the capability to easily insert, delete or change various announcements or other media files including the ability to arrange the order of music and announcements, as well as to a method of programming and using the media player.

The media player is capable of being integrated into various telephone systems to provide desired media to callers on-hold and is capable of being easily and quickly programmed by the user. The media player may include a storage medium having a directory made of at least two files of media content and a storage medium interface configured to receive the storage medium. A controller is configured to read the storage medium and is in communication with the storage medium interface. The media player may further include a signal processing circuit in communication with the controller and a digital-to-analog converter (DAC) in communication with the signal processing circuit. An audio amplifier may also be in communication with the DAC. The media player also include a unique identifier name associated with each of the at least two files of media content and the controller is configured to construct a playlist based on the unique identifier name associated with each of the at least two files of media content.

The media player may include a controller configured to create an order of execution for the playlist, based on the unique identifier name associated with the at least two files of media content.

The media player may also include a controller configured to switch between at least two files of media content after a predetermined amount of time.

The method of programming and using the media player may include storing at least two files of media content in a directory using a unique identifier name on a storage medium; constructing a playlist based on the unique identifier name of the at least two files of media content stored in the directory of the storage medium using a controller of the media player; and executing the playlist when a caller is determined to have on-hold status.

The present invention includes various advantages not present in other media players for a telephone system. For example, the present invention allows for a simplified media player capable of allowing the end user to make frequent changes to the program including changing and modifying the at least two files of media content as well as the order of any playlist and does not require specialized skills and expertise in programming the device, unlike the current systems. The present invention allows further allows cross-mixing of music and voice content that is seamless and has minimal undesirable noise. Furthermore, switching between one file of media content to another and executing only one file media content at a time by the media player of the present invention enhances the sound quality of the media content, and conserves the quality of the media content. Additionally, the media player may be integrated into any telephone system notwithstanding the telephone communication capabilities or protocol.

DESCRIPTION OF THE FIGURES

Other advantages of the present invention will be readily appreciated, as the same becomes better understood by reference to the following detailed description when considered in connection with the accompanying drawings wherein.

DETAILED DESCRIPTION

Figure 1:
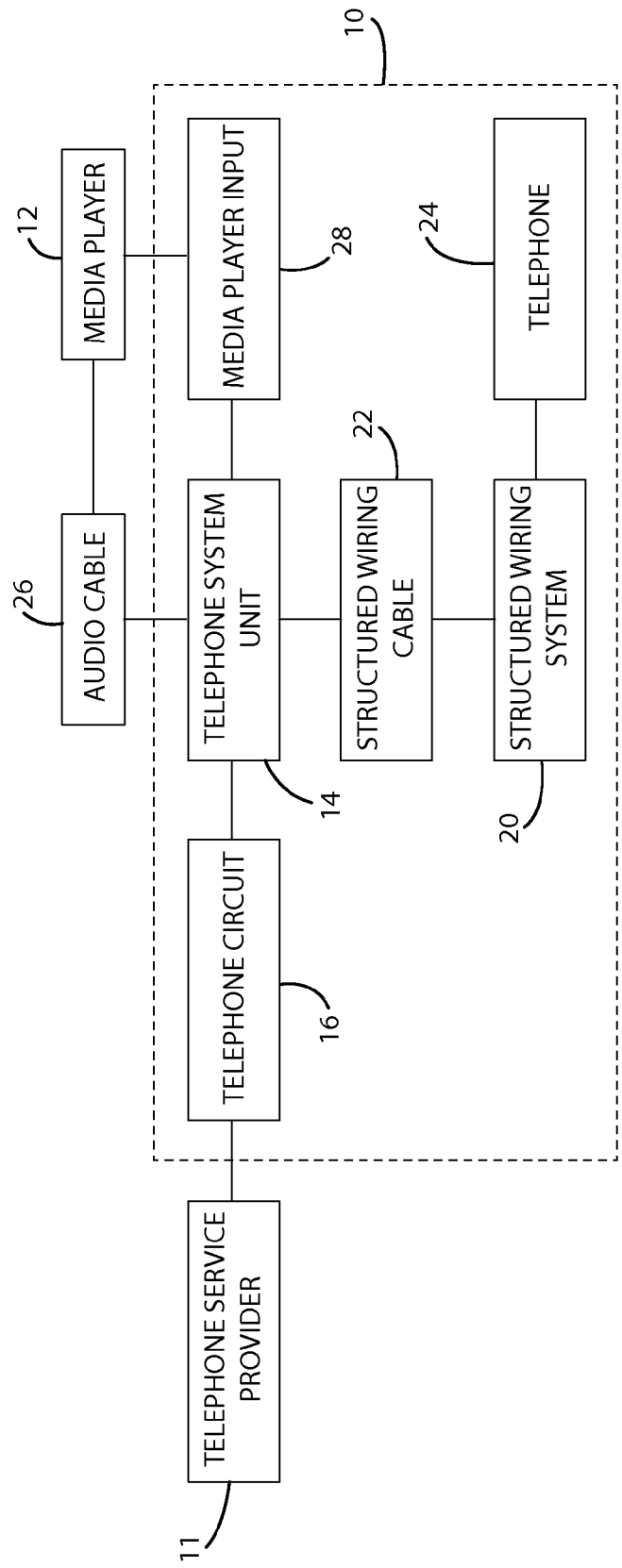
FIG. 1 is an illustration of a telephone system block diagram having a media player of the present invention integrated therein to provide media content to a caller on-hold.

Detailed examples of the present invention are provided herein; however, it is to be understood that the disclosed examples are merely exemplary and may be embodied in various and alternative forms. It is not intended that these examples illustrate and describe all possible forms of the invention. Rather, the words used in the specification are words of description rather than limitation, and it is understood that various changes may be made without parting from the spirit and scope of the invention.

The examples and features disclosed herein provide a media player 12 capable of being integrated into a telephone system 10 to provide media content to a caller on-hold and a method of programming and using a media player 12 for a telephone system so that callers on-hold may be provided with content.

As those of ordinary skill in the art will understand, various features of the present invention as illustrated and described with reference to any of the Figures may be combined with features illustrated in one or more other Figures to produce examples of the present invention that are not explicitly illustrated or described. The combinations of features illustrated provide representative examples for typical applications. However, various combinations and modifications of the features consistent with the teaching of the present invention may be desired for particular applications or implementations.

The present invention is generally directed to a media player 12 configured to interact with a telephone system 10 of an individual, organization, company, entity and the like. The media player 12 is configured to provide media content to the telephone system 10, as described below and may be implemented in a physical hardware device integrated with the telephone system 10, using hardware components, software, or a combination thereof or may be implemented as a soft version on a computer, server, or the like that is integrated with or in communication with the telephone system 10. A media player 12 implemented as hardware in communication with or integrated with the telephone system 10 generally includes a controller 30, memory 32, a signal processing circuit 34, a storage medium interface 36, a storage medium 38, an audio amplifier 40, and an audio output 42. Additionally, the hardware implementation of the media player 12 may also include a digital-to-analog converter (DAC) 44, and an interface logic block 46. A media player 12 that is implemented on a computer or server 76 generally includes a server manager 78, a user interface module 80, an audio management interface 87, a content delivery module 82, and a streaming audio adapter 94.

A telephone system 10 consistent with the systems used by businesses is illustrated in FIG. 1 with a media player 12 of the present invention. The media player 12 is integrated with the telephone system 10 to provide media content to a caller placed in an on-hold status. Typically, the telephone system 10 includes a telephone system unit 14, a plurality of telephone circuits 16, a structured wiring system 20, a structured wiring cable 22, and at least one telephone 24. The telephone system unit 14 is responsible for the routing of telephone calls to an individual from the incoming caller and is in communication with the plurality of telephone circuits 16. The plurality of telephone circuits 16 are also in communication with a phone line from a telephone utility provider 11, such as being in communication with a local telephone company office, switching station, or the like.

The telephone system unit 14 is also in communication with the structured wiring system 20 via the structured wiring cable 22. The structured wiring cable 22 is typically the primary conduit for the telephone system 14 throughout a building. For example, the structured wiring cable 22 may be a riser cable, also known as a backbone cable, and more specifically, may be a twenty-five pair riser cable. Of course, other cable pathways may exist within a building or facility and the particular structured wiring cable 22 or facility may vary substantially depending on current usage as well as expected future use. The structured wiring cable 22 may be formed from traditional copper, optical fibers, or other types of cable. One skilled in the art of course appreciates that the telephone system 10 is not limited to the illustrated configuration cable 22 and other types of cable capable of establishing connection and providing adequate communication between the telephone system unit 14 and the structured wiring system 20 may be used. In addition, in some systems 10 the structured wiring cable 22 and the structured wiring system 20 may not exist.

The structured wiring system 20 is used in traditional phone systems as an easy way to connect wires and is also designed to be the intermediary between the structured wiring cable 22 and at least one telephone 24, such as but not limited to a desktop phone, wall phone, or the like, located on the premise in which the telephone system unit 14 is located. The structured wiring system 20 may be a punchdown block, also known as a quick connect block, or may be a patch panel. The structured wiring system 20 is designed to connect one group of wires such as the structured wiring cable 22 to the wiring (not shown) corresponding to the at least one telephone 24. This enables the location in which the telephone system unit 14 is located to receive telephone calls from individuals within or outside of the location, and route them to or from the proper telephone 24. The at least one telephone 24 may be a plurality of telephones, each having a wire extruding from the structured wiring system 20. Of course, the above described telephone system 10 is an exemplary traditional analog telephone system, and may vary widely depending on the desired function, use, the manufacturer of the equipment, and type of system and technology. In addition, more recent technology such as digital telephone systems and VoIP or Voice over Internet Protocol telephone system may not need some of the above items; and for a hosted VoIP system may simply be a phone connected to an Internet connection.

The telephone system 10, as used in this application, shall broadly refer to any type of telephone system, without regard to manufacturer, technology, type, or the like, and any specific reference to items of the telephone system 10 are exemplary, unless otherwise stated. The media player 12, of the present invention, is in communication with the telephone system 10, specifically in the illustrated example with the telephone system unit 14. The media player 12 is described below as interfacing with an exemplary traditional analog telephone system 10; however, the media device 12 interfacing with a VoIP system or the like will be later described and detailed. The media player 12 may be in communication with the telephone system unit 14 via an audio cable 26 and input cable 28. It is appreciated by one skilled in the art that the media player 12 and the telephone system unit 14 may be connected through other wired or wireless communication and is not limited to connection through the audio cable 26 and media player input 28.

Figure 2:
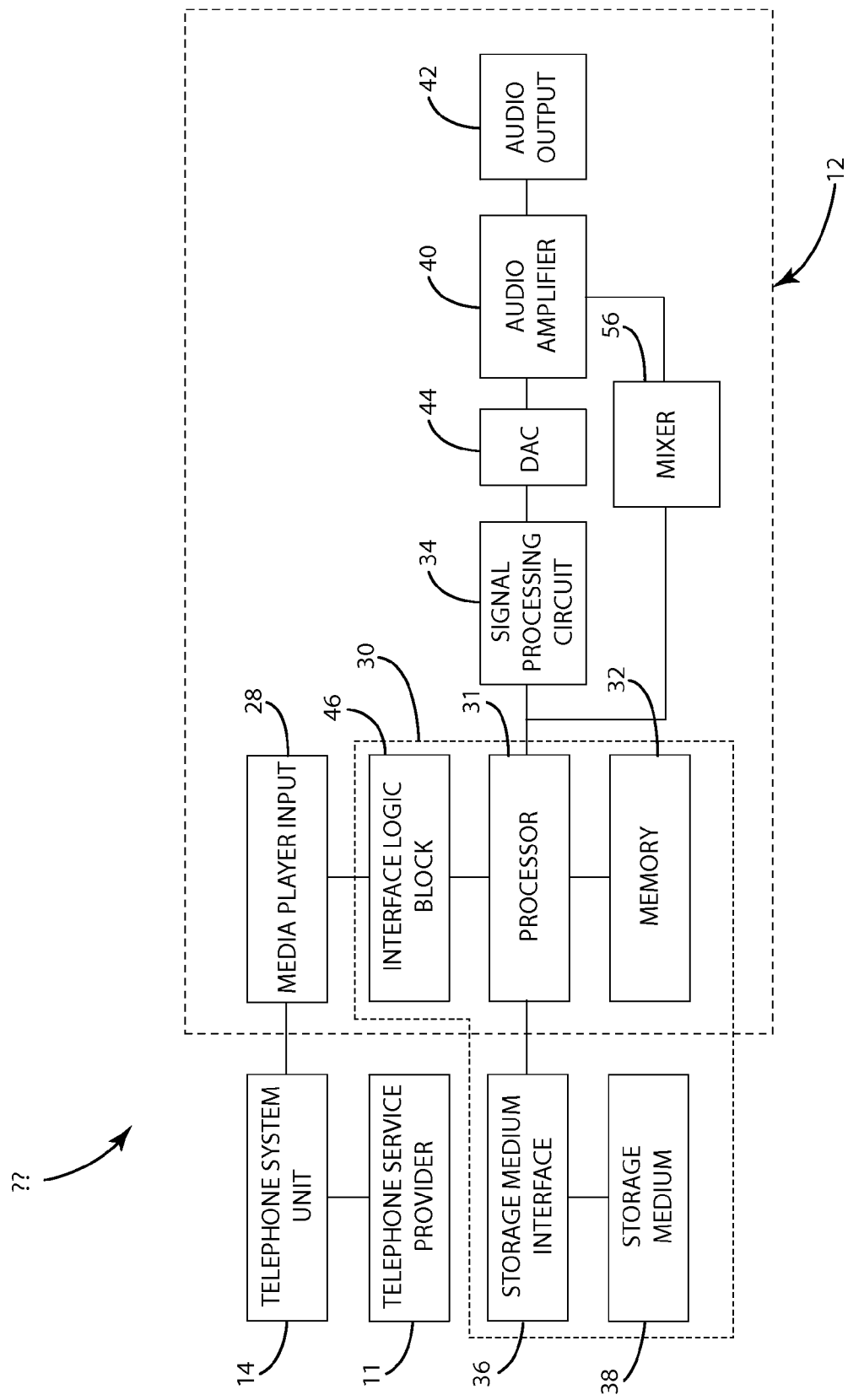
FIG. 2 is an illustration of an exemplary media player block diagram in accordance with the present invention.
Figure 3:
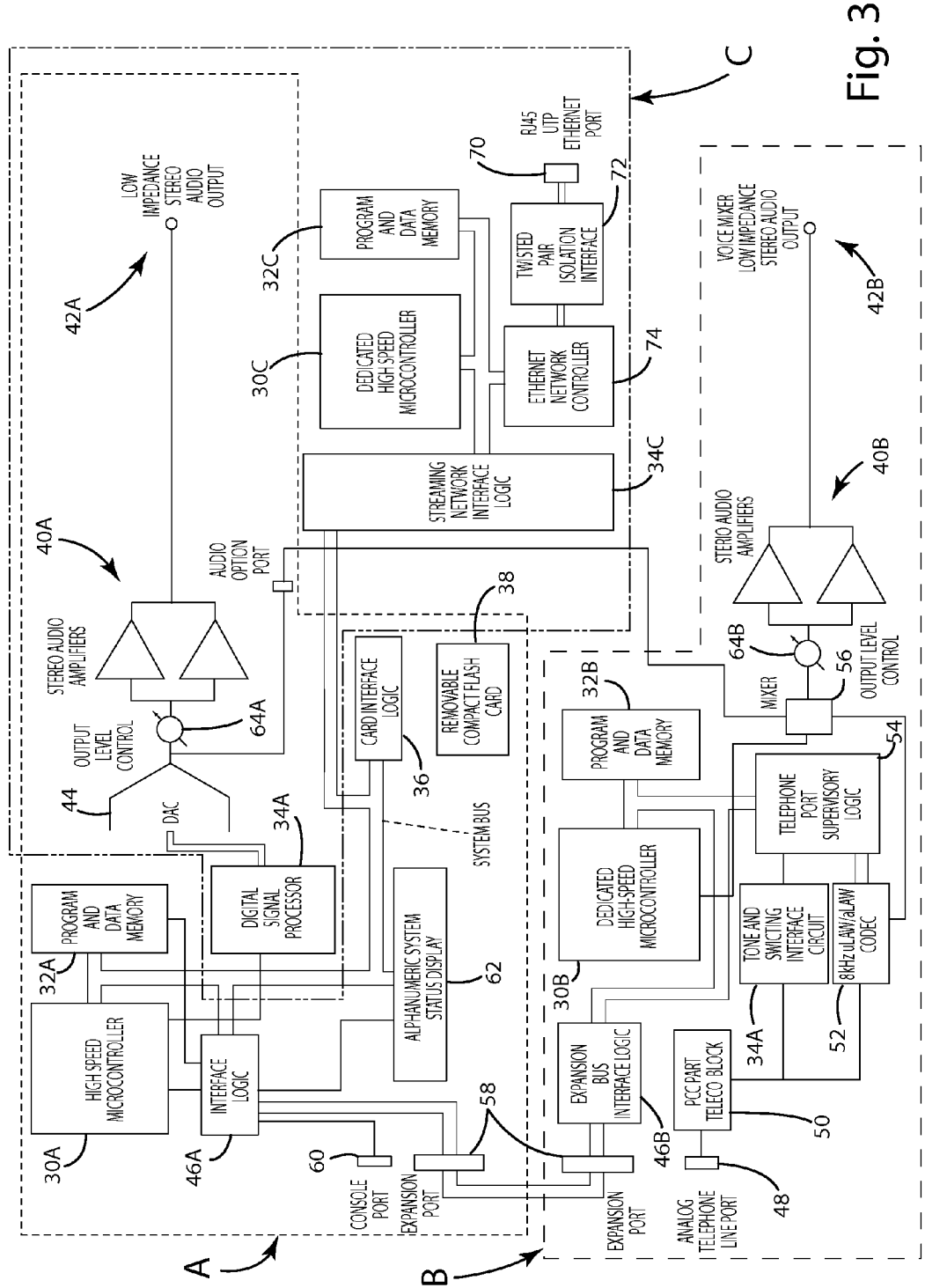
FIG. 3 is an illustration of another exemplary media player circuit block diagram in accordance with the present invention.

The media player 12, as illustrated in FIGS. 2-3, are exemplary illustrations of several hardware configurations, shown in block diagrams, for interfacing with traditional telephone systems. Specifically, FIG. 2 shows an example of the media player 12 utilizing a controller 30 having a processor 31 and memory 32 being capable of supporting a single communication configuration or protocol, such as analog, digital, or VoIP, and multiple communication configurations, including a combination of any and all configurations thereof. While FIG. 3 shows a media player 12 utilizing multiple controllers (30A, 30B, 30C) with memory (32A, 32B, 32C), each configured to perform a specific operation, only one of each or a single controller 30 may be used, as illustrated in FIG. 2. Similarly, FIG. 3 also utilizes multiple signal processing circuits (34A, 34B, 34C), audio amplifiers (40A and 40B), interface logic blocks (46A, 46B, 46C), and audio outputs (42A and 42B), which, could each be combined into single items as illustrated in FIG. 2. As such, the components identified in FIG. 3 have the same functionality to like numeral components of FIG. 2. For example, memory 32A of FIG. 3 performs the same function as memory 32 of FIG. 2, and FIG. 3 primarily is used to illustrate the minor differences the media player 12 may require when working with different telephone technologies. As such, functionality relating to the media device 12 with different specific telephone systems will be described in FIG. 3.

With respect to FIG. 2, the media device 12 may include an audio cable 26 and media player input 28 in communication with the telephone system unit 14 of the telephone system 10. Specifically, the audio cable 26 is designed to output a signal indicative of media content to the telephone system unit 14 which eventually is played through a telephone circuit 16 and/or the telephone 24 when a caller is placed in an on-hold status. The media player input 28 is configured to receive a cable from the telephone system unit 14 which may be in communication with an analog telephone line port 48, Ethernet Port 70, the like, or merely another type of input cable 28, as shown in FIG. 3. Additionally, the media player input 28 may include a plurality of inputs, each designed for different communication configurations, such as to work different technologies. Moreover, this allows for communication between the media player input 28 and the controller 30 specifically the interface logic block 46 of the controller 30. Of course, a separate interface logic to block 46 may be used. The interface logic block 46 is designed to enable management of the controller 30, precisely the processor 31, and may use hardware or software control logic such as logic gates, flip-flops, latches, or any combination thereof to do so. In addition, the controller 30 may have and may utilize any combination of memory 32 storage such as random-access memory (RAM) or read-only memory (ROM), and as illustrated processing resources or a microcontroller or central processing unit (CPU) for the processor 31 with the hardware or software control logic.

The controller 30 is in communication with the storage medium interface 36 which is configured to receive the storage medium 38. The storage medium 38 is configured to store a directory therein and related media content 202. The directory may be capable of including at least one media file which will be described in greater detail below. Multiple directories may exist on the storage medium 38, including one or more media files. The controller 30 is further configured to read the storage medium 38, and process the media files to create the desired audio outputs, as described below. Additionally, the controller 30 is configured to interface with the telephone 24 or a user, to control the recording of voice announcements by the user and/or adding, deleting, or changing the current recording of voice announcements, and to implement TCP protocols for shuffling data and converts TCP packets for a network connection.

The controller 30 is also in communication with the signal processing circuit 34 and the mixer 56. The signal processing circuit 34 is configured to convert raw data received from the controller 30 into a baseband signal. The signal processing circuit 34 and may have other functions, such as further filtering the signal for output. The signal processing circuit 34 is in communication with the DAC 44 which converts the baseband signal into an analog signal. The DAC 44 is in further communication with the audio amplifier 40 which is in turn in communication with the mixer 56 and audio output 42 which outputs the amplified signal to the telephone 24 or telephone system unit 14. The media player 12, in particular the controller 30, is configured to construct, order, and execute a playlist based on an unique identifier name associated with the at least two files of media content stored on the storage medium 38. Additionally, the media player 12 may also be configured to switch between the at least two files of media content. For example, a first file could be music and the second file could not be music if such the media player would switch between the first and second files or any additional media files on the storage medium 38 or in a particular directory.

For clarity and simplicity, the components of FIG. 3 will be described based the functions each is designed to perform. Furthermore, it is appreciated by one skilled in the art that the invention described in both FIGS. 2-3 may be executed entirely by hardware, software, or a combination of hardware and software. Additionally, such software configuration may include a host or cloud based system which will be discussed in greater detail below in FIG. 4.

The circuitry in FIG. 3 may be broken down into three circuits denoted by dashed lines A, B, and C, each labeled respectively. Specifically, the circuitry relating to dashed line A corresponds to the operation of the present invention and is the mechanism responsible to constructing, ordering, and executing a playlist containing multiple files of media content to a caller placed on-hold. The circuitry relating to dashed line B is responsible for interfacing with the telephone 24 or with the user and is primarily used for recording various media content including, but not limited to, voice announcements or sound effects. The circuitry relating to dashed line C is responsible for implementing a network interface, accepting data from the circuitry corresponding to dashed line A and is also responsible for communicating TCP/IP data packets over a network connection.

While the media player 12 is illustrated and discussed as working with all telephone system 10 configurations it should be recognized that a media player 12 working with a specific type of configuration may also be produced that does not work with all configurations. In other words, the media player 12 may be configured to work only with analog telephone systems, while a different media player 12 may be configured to work with digital or VoIP systems. The media player 12 illustrated in FIG. 3 is able to work with most telephone system 10 configurations and is described in detail below; but as one skilled in the art would recognize removal of certain items could limit the media player to specific telephone system configurations. As such, the media player 12 when configured to work with most configurations includes a controller 30, memory 32, and a signal processing circuit 34. The media player 12 may further include storage medium interface 36, storage medium 38, an audio amplifier 40, and an audio output 42, as shown in FIG. 2. Additionally, some examples of the media player 12 may include a DAC 44, and an interface logic block 46.

The circuitry corresponding to dashed line A is responsible for the operation of the media device 12. In other words, the circuitry of dashed line A constructs, orders, and executes the playlist of media content when a caller is placed on-hold. Specifically, the circuitry may include an expansion port 56 in communication with an interface logic block 46A. The interface logic block 46 is in communication with a console port 60. The console port 60 is a connection port for managing the media player 12. The console port 60 may have either a serial connection or have an Ethernet port and may be in communication with the telephone system unit 14 described in FIG. 2.

The interface logic block 46A is also in communication with an alphanumeric display system 62, the controller 30A, the data memory 32A, the storage medium interface 36, and a signal processing circuit 34A which is a digital signal processing circuit. The alpha numeric display system 62 displays characters demonstrating the operation of the media device 12 executing the playlist when a caller is placed on-hold. For example, if voice announcement 1 is playing to a caller on-hold, the alphanumeric display 62 may show the term "voice announcement 1 playing." The alphanumeric display 62 may be, but is not limited to an LCD screen, LED screen, or a vacuum fluorescent screen.

As discussed above, the circuitry of dashed line A includes the controller 30A which may be any controller capable of constructing, ordering, and executing a playlist which plays to a caller in an on-hold status. The controller 30A is in communication with the storage medium interface 36. The controller 30A may have any combination of memory 32A storage such as random-access memory (RAM) or read-only memory (ROM), processing resources or a microcontroller or central processing unit (CPU) and hardware or software interface control logic 46A to enable management of a controller 30A which may have a variety of logic gates, flip-flops, latches, or a combination thereof. Additionally, the controller 30A may include one or more wireless, wired or any combination thereof of communications ports to communicate with different devices. The controller 30A also reads a directory of at least two files of media content stored on the storage medium 38 and parses the directory of media content. The at least two files of media content includes at least one of a greeting, a priority voice announcement, a voice announcement, a music selection, a sound effect selection or any other desired audio output. For example, in place of a music selection and engine performance shop may have audio media or sound effect of engines rolling. The file may be an in MP3, WAV, AAC, or another file format. Each of the at least two files of media content is associated with an unique identifier name which may be set by a user, or auto set once the type of content is determined. The file structure and content names will be described in further detail in FIG. 6. The controller 30A is also in communication with the storage medium interface 36, which receives the storage medium 38. With respect to the storage medium 38, in the preferred example, the storage medium 38 is a CompactFlash card. Alternatively, the storage medium 38 may be another memory card, a USB device, a hard drive, flash memory, or a server of a virtualized media player 76, or even another type memory that is part of the controller.

The controller 30A is further configured to construct a playlist in real time from constituent audio selection sub-parts and based on the unique identifier names programmed by a user. The controller 30A is configured to execute the playlist and in executing the playlist is also configured to mix and switch between different media content forming the parts of the playlist without audible artifacts. In other words, the controller 30A is configured to switch between the at least two files of media content after a predetermined amount of time. For example the playlist may include both a music selection and a voice announcement. The music selection may play for a predetermined amount of time and then the music will fade out and the controller will fade in or play the voice announcement. Upon the voice announcement ending, the controller will play the music selection or some other audio content.

In switching between at least two files, the controller 30A utilizes the signal processing circuit 34A, which is set to 0 by the controller 30A. The signal processing circuit 34A may be a digital signal processing circuit configured to control the digital signal processing circuit and set the circuit to zero (0) when switching between various media contents such as switching from a music selection to a voice announcement. The digital signal processing circuit is further configured to receive a signal from the controller 30B indicative of raw data representing at least two files of media content and to convert the raw data into a baseband signal. The digital signal processing circuit is in communication with the DAC 44 which converts the baseband signal from the circuit to an analog signal to produce sound. The DAC 44 is communicatively connected through an output level control 64A to the audio amplifier 40A. The audio amplifier 4A amplifies the signal to a level suitable for audio playback over the telephone 24 through the audio output 42A.

The circuitry corresponding dashed line B shows the media player 12 having an analog telephone line port 48 configured to interface with an analog phone line of the telephone system unit 14. The purpose of circuitry B is to provide a telephone line interface which acts as an input and output mechanism for the telephone 24. In particular, the analog phone line port 48 is in communication with an FCC Part 68 Telecommunication block 50. The FCC Part 68 Telecommunication block 50 is a protective circuit which ensures that telephone equipment of the telephone system unit 14 and devices connected to the telephone system unit 14 are in compliance with standards required by the government.

As further illustrated in FIG. 3, the FCC Part 68 Telecommunication block 50 is in communication with a signal processing circuit 34B. The signal processing circuit 34B acts as a tone and switching interface circuit which specifically assists in accepting tone signaling inputs and voice audio content for configured playback character scheduling content or file selection or recording timely voice announcement for playback. The signal processing circuit 34B may also have other capabilities. As illustrated in FIG. 3, the tone and switching interface circuit is in communication with the telephone port supervisory logic block 54 which is in turn in communication with the 8 kHz uLaw/aLaw CODEC block 52, a controller 30B, and memory 32B. The FCC Part 68 Telecommunication block 50 is also in communication with an 8 kHz uLaw/aLaw CODEC block 52.

The 8 kHz uLaw/aLaw CODEC block 52 executes an algorithm which increases the signal-to-noise ratio during signal transmission to minimize internal noise. The 8 kHz uLaw/aLaw CODEC block 52 is also in communication with a mixer 56. The mixer 56 is designed to combine two or more signals received from the telephone port supervisory logic block 54 and the 8 kHz uLaw/aLaw CODEC block 52. It is appreciated by one skilled in the art that the mixer 56 may interact with other components in addition to the telephone port supervisory logic block 54 and 8 kHz uLaw/aLaw CODEC block 52 or may interact with other components and either of the telephone port supervisory logic block 56 and 8 kHz uLaw/aLaw CODEC block 52.

As discussed above, the controller 30B is similar to the controller 30 of the FIG. 2 discussed above and is configured to do the same. Specifically, the controller 30B is initialized when the media player 12 is connected to the telephone system unit 14. Additionally, the controller 30B is responsible for recording various media content including voice announcements and processing the recording accordingly for playback. The controller 30B is also in communication with the mixer 56 and may also transmit a signal indicative of recorded media content to the mixer 56, which outputs the signal through the output level control 64B to the audio amplifier 40B. The audio amplifier 40B amplifies the signal to a level suitable for audio playback over the telephone 24 through the audio output 42A. The mixer 56 may also be in communication with an audio port 58 and the circuitry denoted by dashed line A. As stated above, even though controllers 30A, 30B, and 30C may be illustrated as separate controllers, they may be physically formed as a single controller 30 as well any other item shown with multiple items of the same function in FIG. 3 may be instead formed as a single unit or item, similar to the illustration in FIG. 2.

As discussed above, the media player 12 may be used with VoIP-based communication. The specific circuitry related to VoIP-based communication is set by dashed line C in FIG. 3. The resultant audio program created by media player 12 also may be made available over the popular TCP/IP networking protocol using streaming UDP or TCP data packets by way of dashed line C. Such data streams may be utilized by an increasing number of telephone systems units 14, especially those based entirely on the VoIP architecture which may not have an analog audio input connection for on-hold signals. Even in a VoIP system, the media player 12 may connect to an external analog telephone line or a telephone system unit 14 analog extension to facilitate configuration, programming, and editing of spoken content by an authorized administrator, utilizing an expansion board containing an analog telephone interface circuit and a controller 30B with memory 32B and digital interface logic 34B. In such a manner, the operator of the telephone system 10 may use the media player 12 to manage the audio program content themselves and make timely updates to record messages presented to callers while on-hold, rather than relying on an external service provider to perform such service.

In particular, FIG. 3 shows an RT45 UTP Ethernet Port 70 for receiving an Ethernet cable connected to the telephone system unit 14. The RT45 UTP Ethernet Port 70 is in communication with a twisted pair isolation interface 72 which provides isolation from a twisted pair network bus. The twisted pair isolation interface 72 is in communication with the Ethernet network controller 74. The Ethernet network controller 74 allows communication between the telephone system unit 14 having VoIP capabilities and the controller 30C of the media player 12. The Ethernet network controller 74 is in communication with the controller 30C having memory 32C and interface logic 34C. The controller 30C is similar to the controllers 30, 30A, and 30B discussed above and is configured to do the same, and as such, the controller 30A, 30B, and 30C could be incorporated into a single controller, as illustrated in FIG. 2. The interface logic block 34C is in communication with the storage medium interface 36 and the signal processing circuit 34A. Similar to the processing of digital signals in the digital-based communication configuration, the signal produced in the VoIP configuration is derived from the same dashed line A as discussed previously but formulated in the VoIP format facilitating on-hold audio content delivery to telephone system(s) 14 that are exclusively VoIP.

Ultimately, the hardware-based configuration of the media player 12 is configured to initialize itself when power is applied, parse a directory of files therein, construct an internal playlist based on the directory of files, and execute a playback procedure directed by the internal playlist. The media player 12 is also capable of playing a single, pre-produced audio program in a loop scenario like existing audio playback devices, specifically for backward compatibility. The media player 12 does not require the Internet to operate; instead the media player 12 only requires a power supply. Of course, for a hosted VoIP situation, an Internet connection may be required, and in other configuration, the media player 12 may be remote from the telephone system 10 and provide output through the Internet or over a network instead of the illustrated audio cable 26. For all telephone systems, the media player 12 may be remotely located.

As discussed above, the media player 12 functions may also be implemented by software. In other words, the media player 12 may be virtualized as a server-based software-only solution and operate as a private or telephony-vendor-managed service, such as through a cloud based system or a hosted VoIP telephone platform. A hosted VoIP telephony solution does not require a traditional PBX or telephone system hardware to be located at the given facility. Rather, the individual telephones on the premise connect over an Internet connection to the hosted-VoIP solutions provider's server and network, which facilitates the placing and receiving of telephone calls. With the telephone systems 10 being a virtual and a hosted VoIP platform, the media player 12 may also be virtualized and implemented solely in software running on a local or remote computer server, which may even be the same server as the server for the VoIP system.

Figure 4:
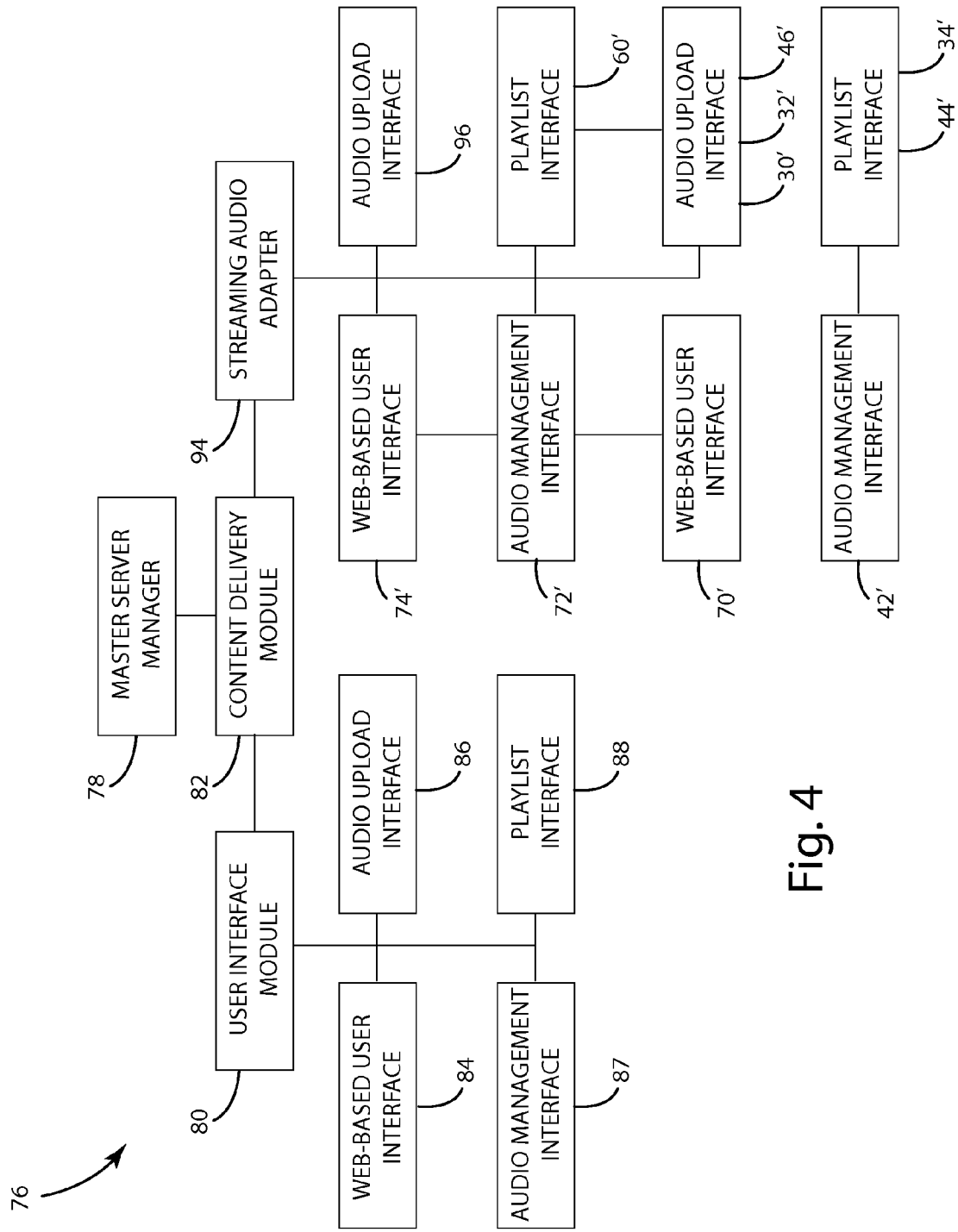
FIG. 4 is a block diagram of a software implementation of the media player.

The block diagram of FIG. 4 illustrates the media device 12 as purely a software implemented system media player 12. To function purely as a software implemented system, the media player 12 becomes a media player virtual server 76 which includes a master server manager 78. The master server manager 78 operates autonomously as a multi-process or multi-thread program running on an Internet-connected server apparatus, and may have its own operating system. The master server manager 78 manages the key subcomponents of the virtual media player such as a user interface module 80 and the content delivery module 82. The server manager 78 may also perform reliability monitoring, network utilization monitoring, and load balancing. The server manager 78 component is responsible of accepting initial remote client and user network connections on assigned TCP or UDP ports, and handing off those connections to other modules. Security and denial-of-service monitoring is also implemented within the master server manager 78 component, and may also be based on the user's use of the system.

The virtualized media player 76 may also include the user interface module 80 and the content delivery module 82, previously discussed. The user interface and content delivery modules 80, 82 as well as the master server manager 78 may co-exist as multiple processes, threads, or jobs on a single server apparatus, or may be deployed on multiple physical server apparatuses interconnected by a local or wide area network. The user interface module 80 includes a web-based user interface 84 to allow an audio service user to manage audio content files, alter playback configurations setting, and configure to stream TCP or UDP, and access credentials used by a VoIP telephony system to connect to the media player virtual server 76 and receive streaming audio program content digitally via the Internet or a private network.

The web-based user interface 84 must make use of secure socket layer (SSL) or other industry best-practices transport layer security (TLS) mechanism to protect the session data. Each user is assigned account credentials such as a username and a password, and a dedicated private storage area on the media player virtual server. The user may be presented with a simple multi-tab device management menu allowing complete control of the media player virtual server 76 configuration for the user's resultant audio program delivery service. Additionally, the web-based user interface 84 includes the following features: a password functionality interface which enables the user to manage and change their password. To successfully change a password, the user should choose characters that meet established strong password standard, which may use software to check the prospective password against a system password history dictionary. The user interface 80 also includes an audio upload interface 86 which allows the user to upload audio content files for the greeting, priority announcement, repeating voice announcements, as well as the background music selections.

The audio management interface 87 may also exist or may be integrated within the audio upload interface 86. The audio management interface 87 allows the user to view a current listing of the files stored in the user's media player virtual server account and the user may rename or delete files. The user interface 80 may further include a playlist interface 88, which allows the user to view the resultant audio program playlist in the actual order that the voice and music selection will play, as determined by the automatic playlist algorithm. The automatic playlist algorithm is described in more detail in FIG. 8. An audio stream interface 90 allows the user to set access credentials and network addresses for one or more remote telephony platform clients that will connect to the media player virtual server 76 to receive the resultant audio program as configured by the user. Additionally, the user interface 80 may include an enable and a disable audio interface 91 to allow the user to quickly deny remote telephony platform client network access to the resultant audio program and the user audio content management tools to allow the user to convert certain uploaded file formats to a format that is compatible with the media player virtual server streaming software. Popular formats such as MP3, uLaw, aLaw, AAC, and others may be supported.

The user interface 80 may also have a background music purchase portal 92 to allow the user to listen to samples of, and make purchase selections of various pre-recorded royalty free music selections through an affiliated music provider or vendor. Upon completing a purchase, the musical selection file(s) are placed in the user's audio content file storage area for automatic algorithmic inclusion in the active resultant audio program playlist. Rights management is designed to prevent unauthorized downloading of the music selection files or other limitations as required by the contractual relationship with a music provider or vendor.

The content delivery module 82 accepts inbound or initiates outbound network connection to remote devices in order to establish a digital data network connection to remote devices and to establish a digital data stream through which the resultant audio program content may be delivered. The control of which remote devices may connect to the content delivery module 82 is managed by the master server manager 78 in accordance with configuration parameters established by the media master device virtual server's 76 operator, as well as individual service settings stored in the user accounts. The content delivery module 82 implements the hardware media player playlist algorithm as previously discussed and assembles a resultant audio program in near real-time for delivery as a digital audio stream to a remote device. The stream format may be uLaw, one of several popular VOIP encoding formats, or other formats as configured by the media player virtual server operator.

Together, the components of the media player virtual server 76 allow the same functionality of the standalone media player 12 to be deployed on a larger scale, leveraging the strength of the Internet, or organizing wide private data networks. In certain telephone systems, a streaming audio adapter is necessary to connect older on-premise telephone systems to streaming network-based audio program services. The operation of the audio adapter device is simple and requires little administration beyond initial configuration. The streaming audio adapter device 94 contains a controller 30' with connected program and data memory 32'; non-volatile data memory 32' for storing configuration and performance measurement data; a network interface 74', typically 10/100 twisted pair Ethernet 72'; serial console port 60' for console configuration access; a signal processing circuit 34', and a DAC 44', an audio amplifier 40' driving a power-limited low-impedance audio output 42'; and a power supply circuit 96 that provides agency required isolation, noise filtering and leakage circuit protection. The components described herein are similar to the components described in FIGS. 2-3 and are configured to do the same. For example, the controller 30' is similar to the controllers 30, 30A, 30B, 30C, 30D and is configured to do the same.

Upon connection to the network and application of power, the device initially enters a self-test mode, testing memory, network components, and power supply voltages. Upon completion of self-test, the device awaits configuration input by the user, either by one of the ARP or SFTP protocols, or by connection of a console terminal device to serial port 60'. Upon completion of the configuration by the administrator person, or if no configuration stimulus is provided, the device automatically enters executive mode and attempts to perpetually initiate and maintain a streaming connection to a remote server via the configured TCP/IP protocols. Successful connection to a streaming server results in audio program content being delivered to the audio output connector as an audio signal, which may then be connected to an on-premise telephone system. Media content or data sent from the server may be sent via the TCP or UDP protocol, and encoded in variety of popular formats including uLaw, aLaw, or other formats as configured.

The media player 12 may function as the media player virtual server 76 when implemented as a software-only solution which provides various advantages including the ability for an organization with multiple physical locations to connect them to the resultant audio program produced by the media player virtual server 76 over a private data network or the Internet. The result is a reasonably reliable, low-cost system to provide consistent on-hold audio content to all physical locations concurrently, and a system to manage the content from a centralized location. Organizations that have older generation on-premise telephone systems may not be able to connect such systems directly to a private data network or the Internet to receive the resultant audio program stream generated by the media player virtual server. However, connecting a simple streaming audio client adapter device 94, previously described, to such older generation premise telephone systems, would permit network delivery of the digital audio content.

A service provider 11, such as a telephone carrier that offers remotely-hosted VoIP telephony services to small businesses and public-sector organizations could deploy the media player virtual server as a mechanism for delivering feature-rich, self-managed on-hold audio content to their subscribers. Using the methods set forth below with respect to FIG. 8, as well as the features such as automatic playlist generation, directory, file management, and other characteristics, the server-based software program will perform the same functionality as the standalone hardware media player 12, using the same general algorithms.

The media player 12, as described in FIGS. 1-4, is easily reprogrammable or reconfigurable, allowing a user to remove or interface with the media player's storage medium and add, remove or delete, or change files from the directory at any time using a computer. Alternatively, the user interface of the server based media player 12 may reprogram various media content utilizing a computer and the web-based user interface. Thus, the user could easily change the voice announcement executed when the caller is on-hold every day to fit their needs.

Figure 5:
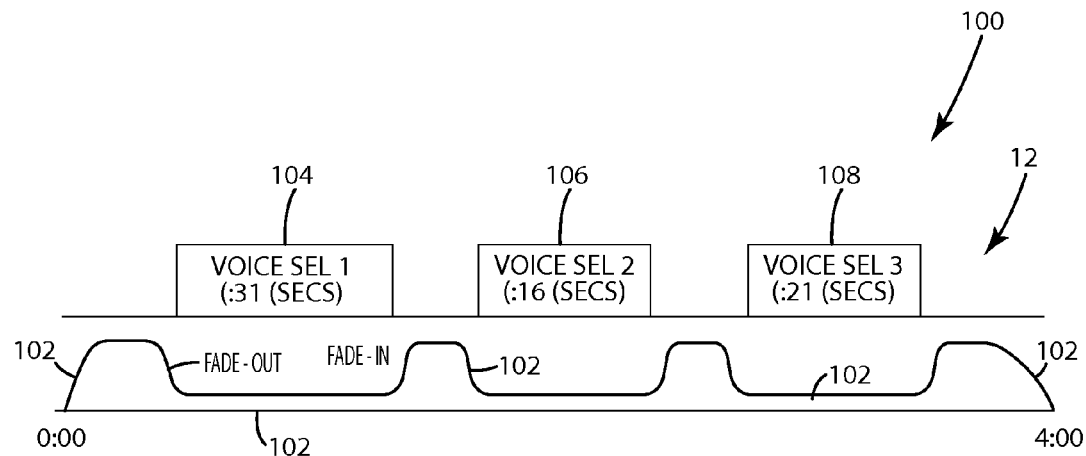
FIG. 5 is an illustration of a prior art playlist timeline.
Figure 6:
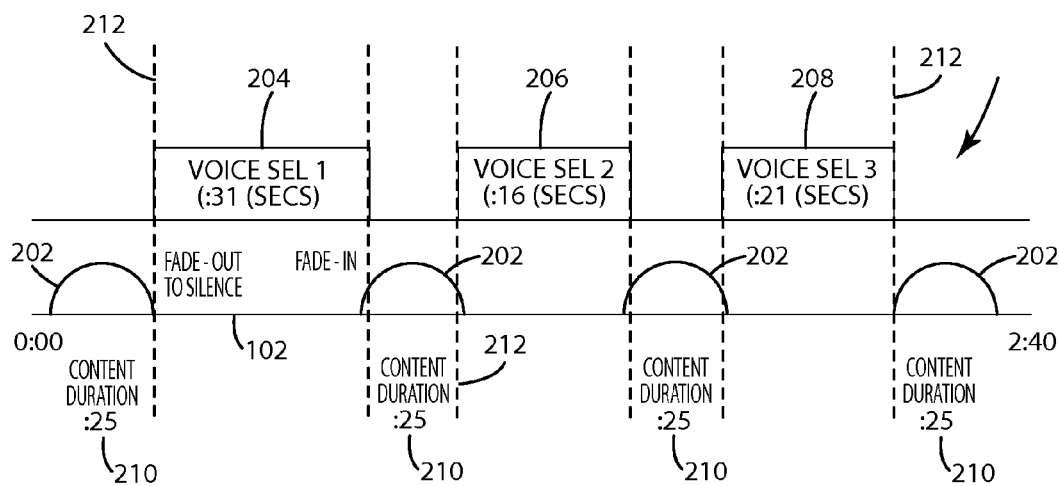
FIG. 6 is an illustration of an improved playlist timeline in accordance with the present invention.

FIGS. 5-6 are illustrations of a prior art playlist 100 timeline and an improved playlist 200 timeline. Each timeline specifically shows the relative signal amplitude of exemplary music and voice media content with respect to time and the order of execution pre-produced in FIG. 5 and constructed by the media player 12 in FIG. 6. Of course, any type of audio content could be substituted for the listed music or voice content such as a sound effect. In particular, FIG. 5 describes and shows a playlist timeline 100 utilized by the prior art. In other words, the playlist 100 is a single track formed from both segments of music selection 102 and voice announcements 104, 106, and 108 mixed or layered on one another for an arbitrary amount of time. However, while each segment may last for an arbitrary amount of time, the total length of the timeline 100 is based on the total length of the music selection 102 and prior systems can only loop this single file in the original order. For instance, if the music selection 102 selected for FIG. 5 is four minutes in length and there are three voice announcements 104, 106, and 108, which may be different, then the playlist timeline 100 will be a total of four minutes with three voice announcements 104, 106, and 108 intermixed within.

Traditionally, these playlists are pre-produced by a manufacturer or seller and are not reconfigurable, unlike the playlist 200 of the present invention shown in FIG. 6, which will be described in greater detail below. In operation, the playlist 100 shown in FIG. 5 begins with a music selection 102 playing at full volume. After an arbitrary amount of time, the music fades to low volume and continues to play as background music as the first voice announcement 104 plays for thirty-one (31) seconds. After the first voice announcement 104 has played, the music selection 102 fades back up to full volume and against plays for an arbitrary amount of time until the second voice announcement 106 is executed. When the second voice announcement 106 is playing, the music selection 102 continues to play in the background at low volume. This continues until the entire music selection 102 and voice announcements 104, 106, and 108 are played to the caller on-hold. This prior art configuration of the playlist timeline 100 present many problems. For example, the layering and playing of music 102 and voice announcements 104, 106, and 108 simultaneously make it difficult for the caller on-hold to hear or decipher the voice messages. Additionally, depending on the type of communication configuration, mixing and layering music 102 and voice announcements 104 106, and 108 may result in undesirable noise such as pops, clicks, and garbled sounds when the music and voice content is played. Furthermore, the continuous playing of music in the background of the voice announcement does not preserve, conserve, or enhance the quality of music playing.

With respect to FIG. 6, an example playlist 200 executed by the media player 12 described herein is shown. The playlist 200 may be set by the user of the media player 12 i.e. the individual, business, organization, or other entity and the playlist 200 may be composed of a first media content 202 and a second media content 204. In FIG. 6, the first media content 202 is a music selection and the second media content 204, 206, and 208 are voice announcements. However, it is appreciated by one skilled in the art that the first media content 202 may be content other than music such as a sound effect selection and may be a sound unique to the business, organization, or other entity. For example, an automotive supplier may have selected the sound of a revving engine as the first media content 202.

Once a playlist 200 is selected by the user, the playlist 200 is constructed and initialized on the media player 12 as well as the different media content are ordered and mixed together to assemble an audio program for callers on-hold. With respect to cross-mixing the various media contents, FIG. 6 illustrates that the second file type such as voice selections 204, 206, 208 and a first file type such as music selections 202 are not executed or played at the same time and are not layered on one another like conventional on-hold systems described above in FIG. 5. In other words, unlike the conventional systems, the voice announcements 204, 206, 208, and music selections 202 shown in FIG. 6 do not play simultaneously and are not part of a single media file. Instead, the first file type music selection 202 is executed for a predetermined amount of time 210 and then fades out completely and stops the music selection for the second file type voice announcement to be executed. In an exemplary example, the predetermined amount of time 210 may be anywhere from 25 to 40 seconds. However, the predetermined amount of time may be under a minute or may be set to a specific time by the user. When the voice announcement 204 is finished, the music selection or sound effect 202 fades in and continues to play from the place in which the music left off, may switch to a file and the music or sound effect will pick up from where the music or sound effect left off, or may switch to a different music selection or sound effect. Switching between multiple files is denoted by dashed line 212. The music selection 202 will then fade out again to silence after the predetermined amount of time 210 and a second voice announcement 208 will be played. This cycle continues until the entire playlist 200 including music selections 202 and voice announcement 208 has executed and may continue to play in a loop format as will be described in FIG. 7. Of course, the order may be varied.

The playlist 200 described in FIG. 6 has various advantages as discussed above. Specifically, FIG. 6 demonstrates switching between multiple files of media content which minimizes the amount of undesirable noises such as pops, clicks, and garbled sounds which occurs in previous systems during the mixing and layering of music and voice announcements. Additionally, the playlist 200 shown above conserves the quality of the media content when played, unlike conventional systems which continuously play music in the background of voice announcements. Moreover, the playlist's set up minimizes noise and interference experienced by callers placed in an on-hold status utilizing cell phones since the voice announcements and music selections are not played simultaneously.

Figure 7:
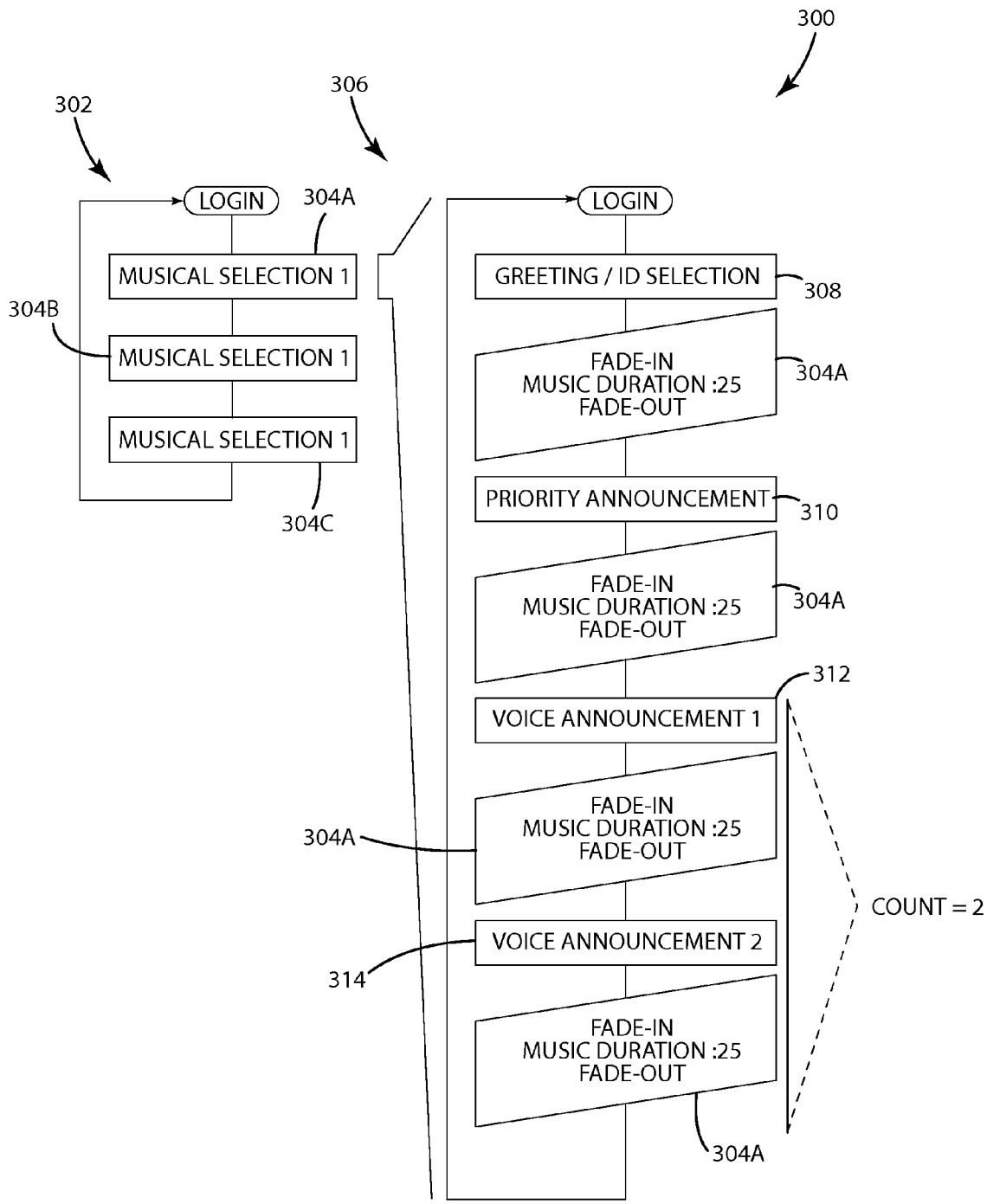
FIG. 7 is a flowchart of a playlist creation logic timeline in accordance with the present invention.

A flowchart of the logic playlist timeline in accordance with the present invention is shown in FIG. 7. In particular, an outer loop 302 having a first music selection 304$a$, a second music selection 304$b$ and $n^{th}$ (up to any number of) music selections 304$c$ is shown as well as an inner loop 306 having a greeting or identification announcement 308, a priority announcement 310, a first voice announcement 312, and a second voice announcement 314. Additionally, FIG. 7 shows the inner loop 306 corresponding to the first music selection 304$a$ of the outer loop 302. In operation, the outer loop 302 is executed, the first music selection 304$a$ is played for a predetermined amount of time (as discussed above around 25 seconds), and then the inner loop 306 begins to execute and plays the greeting/ID announcement 308. After the greeting/ID announcement 308 has played entirely, the first music selection 304$a$ fades in and plays for another predetermined amount of time before fading out of the music selection into a priority announcement 310. This continues until all voice announcements 312 and 314 are played.

Figure 8:
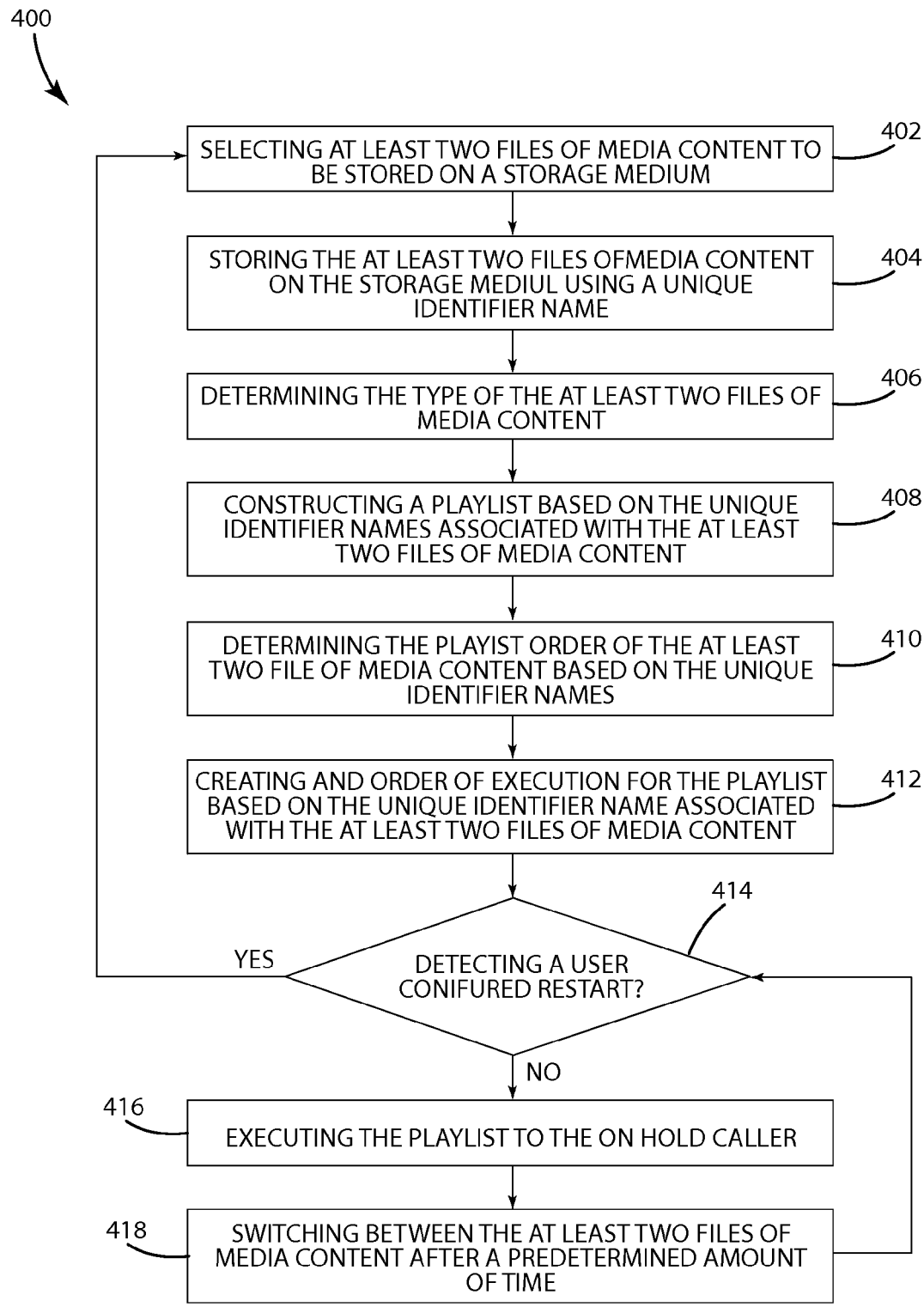
FIG. 8 is a flowchart of a method of programming and using a media player capable of being integrated into a telephone system to provide media content to a caller on-hold in accordance with the present invention.

With respect to FIG. 8, a flowchart of a method of programming and using a media player 12 capable of being integrated into a telephone system 10 to provide media content to a caller on-hold 400 in accordance with the present invention is provided. The method may include selecting at least two files of media content to be stored in a directory 402 on a storage medium 38. The at least two files of media content may include one of the following: 1) a greeting, 2) a priority voice announcement, 3) a music selection, and 4) a voice announcement. Of course, the system may have multiple voice selections. The greeting, priority voice announcement, music selection, and voice announcements may be in the form of a MP3, AAC, or WAV. The at least two files of media content may be pre-produced by the manufacturer or user, may be recorded by the user, and may be reprogrammed by the user. The storage medium 38 may be any of the storage mediums described above in FIG. 1.

After at least two files of media content is selected, the at least two files of media content may be stored on the storage medium 38, utilizing a unique identifier name 404. When the storage medium 38 is received by the media player 12, the media player 12 determines the type of the at least one media content 406. As discussed previously, the media player 12 permits and recognizes at least four distinct logical audio selection types i.e. 1) greeting, 2) priority voice announcement, 3) music selection, and 4) voice announcement. This corresponds to the type of recording, and effects how the recording will be inserted into the end-result audio program. The user creating the audio selection files has prior knowledge of the type of content in the file the user is creating, and has the ability through common means to name the file in a manner that reflects the content, while preserving the ability to give files arbitrary names of significance to the individual.

To inform the media player about the file content type, the user utilizes a unique first character to create a unique identifier name and to denote the content type as follows:

I—Voice identification/greeting
P—Priority voice announcement
V—Voice announcement
M—Musical selection For example, an existing audio file in the MP3 format as it appears on a typical desktop computer platform, named "SONG1.MP3." Before loading the file onto the storage medium for insertion into the media player, the creator would rename the file "M_SONG1.MP3." The media player 12 may now immediately ascertain the audio program content simply by reading the file system's directory entry for that particular file. It should be noted that the above naming steps may be graphically selected to ensure ease of use.

Similarly, assume an existing audio file in the MP3 format as it appears on that same typical desktop computer platform, named "GREETING.MP3", a voice recording of the greeting script referenced in [REF1]. Before loading the file onto the storage medium for insertion into the media player, the creator would simply rename the file "IGREETIN.MP3" or "I_GREET MP3" or "I_DONT.MP3" or even "I12349ZO.MP3". The media player would properly ascertain the audio selection content to be an identification/greeting selection. In the case of a priority voice announcement, the first character of the file is changed to a "P". In the case of a regular voice announcement, the first character of the file name is changed to a "V". However, one skilled in the art appreciates that the characters used for naming a file are not limited to "I", "P", "V", or "M" and may be any character, symbol, or number designated by the user or by the manufacturer of the media player.

The method further includes constructing a playlist based on the unique identifier name of the at least two files of media content 408 stored the directory of the storage medium 38 using a controller 30 of the media player 12. The media player 12 may use algorithms for constructing end result audio program in real time from constituent audio selection sub-parts. As the media player 12 is parses the storage medium's 38 file system directory, it is able to ascertain the media content therein. However, in order to create the completed end-result audio program, the ordering in which audio selections are played is significant.

By default, the media player 12 follows a practical algorithm for ordering the audio selections, as a set of nested loops (see FIG. 7). In order to provide the end result audio program appearing to the on-hold listening party(s), one or more background media content must be played from beginning to end, subject to apparent modulation by fading out and fading in as voice announcements are inserted. As shown in FIG. 7, the music selection play ordering is considered the outer loop:

```
<ORIGIN>
<MUSICAL_SELECTION_1>
<MUSICAL_SELECTION_2>
<MUSICAL_SELECTION_N>
<LOOP_TO_ORIGIN>
```

The media player 12 follows a similar ordering algorithm for the greeting/identification announcement, the priority announcement if present, and the voice announcements. The music play duration is programmable to any desired length of time but would typically be configured at 25 to 40 seconds, in the example. The count of voice announcements played in the inner loop is also programmable to any desired number, but in the illustrated example would typically be configured to 2 or 3. The media player 12 may be configured such that the greeting/id is always played. The priority announcement(s) is played only if the priority announcement audio file is present on the storage medium. If the priority announcement audio file is not present, an additional voice announcement is played instead, raising the total voice announcements to count+1. The voice selection play ordering is considered the inner loop and would cycle through as illustrated below:

```
<ORIGIN>
<MUSIC_PLAY_DURATION>
<FADE_OUT>
<GREETING/ID_SELECTION>
<FADE _IN>
<MUSIC_PLAY_DURATION>
<FADE_OUT>
<PRIORITY_ANNOUNCEMENT_SELECTION>
<FADE _IN>
<MUSIC_PLAY_DURATION>
<FADE_OUT>
<VOICE_ANNOUNCEMENT_1-COUNT 1 >
<FADE _IN>
<MUSIC_PLAY_DURATION>
<FADE_OUT>
<VOICE_ANNOUNCEMENT_2-COUNT2>
<FADE _IN>
<MUSIC_PLAY_DURATION>
<FADE_OUT>
<VOICE_ANNOUNCEMENT_N-COUNTN>
<FADE _IN>
<LOOP_TO_ORIGIN>
```

Combining the two loops in real time produces an end-result appearing as a seamless, professionally produced audio program, with studio-quality fade-out and fade-in sequences.

The following example describes a scenario where the sum total of music play duration times and voice selection times is less than the total length of the musical selection. With longer music play durations, more voice selections, or longer voice selections, the sum total time will exceed the total length of the musical selection, prompting advancement to the next musical selection, or looping to the beginning of the musical selection, in the case of a single musical selection.

```
<ORIGIN>
<MUSICAL_SELECTION_1_PLAY_DURATION>
<FADE_OUT>
```

```
<GREETING_ID_SELECTION>
<FADE_IN>
<MUSICAL_SELECTION_1_PLAY_DURATION>
<FADE_OUT>
<PRIORITY_ANNOUNCEMENT_SELECTION>
<FADE_IN>
<MUSICAL_SELECTION_1_PLAY_DURATION>
<FADE_OUT> <VOICE_ANNOUNCEMENT_1>
<FADE_IN>
<MUSICAL_SELECTION_1_PLAY_DURATION>
<FADE_OUT>
<PRIORITY_ANNOUNCEMENT_2>
<FADE_IN>
<MUSICAL_SELECTION_1_PLAY_DURATION>
<FADE_OUT>
<PRIORITY_ANNOUNCEMENT_N>
<FADE_IN>
<LOOP_TO_ORIGIN>
```

The media player 12 also determines the playlist order of the at least two files of media content based on the unique identifier name 410 via the controller 30. The method further includes creating an order of execution for the playlist based on the unique identifier name associated with the at least two files of the media content 412 using the controller 30. The ordering of the music and voice selections denoted by numbers 1, 2, and N directly correlate numerically to the selection order stored in the media player's internal playlist. This ordering is determined as the file system's directory structure is traversed sequentially, and results in the selections being entered into the playlist in the order in which they appear in the file system directory structure.

It should be recognized that optionally, the audio file creator may name the files uniquely to force their ordering to be different from their directory structure appearances. As discussed above, the file creator uses a unique character to create the unique identifier name in the first position of the filename to denote the audio content type for the file. Of course, a different placement other than the first character could be used. In a similar manner, the last three characters of the filename may be used to denote the desired playlist ordering. For example, consider an audio content file on the desktop platform with the name "MY_RECOR.MP3" which contains a recording of a voice announcement that the creator would like to appear as the fourth voice selection played in the loop algorithm. The first character of the filename would be changed to "V" to indicate it is a voice selection, and the last three characters would be changed to "004". The resultant filename would then become "VY_RE004.MP3" or "VMY_RECOR004.MP3" if it appends the characters to the existing file name.

Additionally, the method includes detecting a user configured restart 414 via the controller 30. In detecting the user configured restart, the controller 30 detects the presence of the storage medium 38. If the controller does not detect the presence of the storage medium 38, then the method starts over at 402 and at least two files of media content may be selected to be stored on the storage medium 402. However, if the controller detects the presence of the storage medium 38, the playlist is executed 416. In executing the playlist 416, the controller 30 is configured to switch between at least two files of the at least two files of media content after the predetermined amount of time 418. The playlist described herein is not a single file but instead is comprised of multiple files, unlike conventional media player and methods. Since the playlist include multiple files, switching between the multiple files allows for cross-mixing the files without audible artifacts, and easy recording or modification. As a result, the media player produces a smooth, seamless end-result audio program that the listener may enjoy without clicks, pops, and garbled sounds.

The complex nature of the MP3 audio compression protocol makes combining compressed audio data streams difficult to achieve without aesthetically unpleasant artifacts. MP3 audio formats may vary in the source data stream bit-rates, as well as the type of stereo encoding. Attempting to digitally combine the streams seamlessly for audio fade or cut transitions is computationally intense and exceeds the capabilities of reasonably priced processors. Therefore, the present invention hides the transitions between MP3 audio file playback by executing a controlled fade out, maintaining a zero output level during file change operations, maintaining a zero output level for a sufficient number of MP3 frames, then executing either a controlled fade in, or a cut to full volume. The output level manipulation may be performed on the digital signal processing circuitry by interrupting the data stream sent to the digital-to-analog converter.

In doing this, the media player allows for voice announcement audio intelligibility enhancement and music conservation. Contemporary telephony systems are comprised of analog, digital, cellular, and Voice over IP transmission methods. Not all of the methods preserve the same level of perceived audio quality at the listening party(s) ear. For example, music and complex sounds may become difficult to hear due to improperly ordered TCP/UDP packets on a VoIP circuit, or poor signal reception conditions on a digital cellular circuit. Even under ideal transmission conditions VoIP and cellular telephony still suffers from considerable audio distortion artifacts inherent to the compression mechanisms required by those communication technologies.

A traditional on-hold audio program might include background music behind the spoken voice announcement, shown in FIG. 5. For a directly-wired analog circuit, this may be acceptable and aesthetically pleasing. However, when delivered via contemporary mixed-technology telephone transmission mechanisms, the ear result often sounds very poor. It is desirable for the media player to successfully deliver informative voice announcements to on-hold party(s), thus the audio quality at the listener's ear is critical. The overall audio quality is greatly improved by the audio program playlist 200 of the media player 12 shown in FIG. 6 by utilizing switching between separate files of both music and voice announcements and playing one file at a time, unlike the playlist 100 of FIG. 5 which utilizes a single file having both music and voice announcements layered on one another.

In addition, playback of the musical selection currently indexed by the playback algorithm halts upon conclusion of the fade-out execution, while the voice selection is playing. Upon completion of the voice announcement, music selection playback begins at the last stored playback pointer location, a fade-in is executed, and play continues until the algorithm calls for the next voice announcement. For example, given the previous example, if the musical selection is 4 minutes long, and each of the three voice announcements are 15 seconds each, the apparent length of the musical selection becomes 240+45=285 seconds, less the time duration of the fade-out and fade-in executions. This is a net gain of nearly 1 minute of music that would have been "wasted" otherwise.

Management of music and voice announcements and the order in which they will be played may be effected simply by how the files are named and the ordering of how they are placed on the storage medium. Changes may be made to one or more individual announcement files without requiring modifications to the musical selections. Musical selections may be changed without requiring modifications to the voice announcements. A priority voice announcement may be added or removed at any time without adversely affecting the other voice announcements. No audio editing software or equipment is necessary to create the end result audio program, and in most cases is not required to create the individual voice announcement audio files or music selection audio files.

While examples of the invention have been illustrated and described, it is not intended that these examples illustrate and describe all possible forms of the invention. Rather, the words used in the specification are words of description rather than limitation, and it is understood that various changes may be made without departing from the spirit and scope of the invention. Additionally, the features and various implementing embodiments may be combined to form further examples of the invention.

What is claimed:

1. A media player capable of being integrated with a telephone system to provide media content to a caller on-hold, the media player comprising:
    a storage medium configured to store at least two files of media content; and
    a controller in communication with said storage medium and said controller is configured to read said storage medium, and wherein said controller constructs a playlist based on a unique identifier name associated with each of the at least two files of media content and wherein the at least two files of media content includes a non-announcement selection and at least one announcement selection, and wherein said controller is configured to identify which of the at least two files of media content is the non-announcement selection and which of the at least two files of media content is the at least one announcement selection based on said unique identifier name.

2. The media player of claim 1, wherein the at least one announcement selection includes at least one of a greeting, a priority voice announcement, a voice announcement, and the non-announcement selection includes a music selection and a sound effect selection.

3. The media player of claim 1, wherein said storage medium is one of a CompactFlash card, an SD card, USB drive, flash memory, a hard drive, and a server.

4. The media player of claim 1, further including a storage medium interface configured to receive said storage medium, and wherein said controller is in communication with said storage medium interface, and wherein said controller is capable of detecting the presence of the storage medium.

5. The media player of claim 1, wherein the at least two files of media content include a first file and a second file and wherein said controller is configured to switch between the first file and the second file after a predetermined amount of time of the output the first file.

6. The media player of claim 5, wherein the first file stops playing when the controller switches between the first file and the second file, and wherein the first file resumes where the first file stopped after the second file has played.

7. The media player of claim 5, further including a signal processing circuit being in communication with said controller, said signal processing circuit being configured to receive a raw signal of media content from the controller and convert the signal into a baseband audio signal of media content for output to an audio output.

8. The media player of claim 7, wherein said signal processing circuit is set to 0 when said controller switches between said the first file and the second file of the at least two files of media content.

9. The media player of claim 8, wherein the controller switches between said at least two files of media content to allow output of one file of media content at a time to enhance the delivered quality of the media content.

10. The media player of claim 7, further including a digital-to-analog converter in communication with said signal processing circuit, and an audio amplifier in communication with said digital-to-analog converter.

11. The media player of claim 10 wherein the digital-to-analog converter receives the baseband signal from said signal processing circuit and converts the baseband signal to an analog signal for output to the audio output.

12. The media player of claim 10, wherein the audio amplifier amplifies the analog signal to a level suitable for output to the audio output.

13. The media player of claim 1 further includes an audio adapter in communication with the controller, and wherein the audio adapter is configured to format a signal of media content for streaming over an Ethernet network.

14. A media player capable of being integrated with a telephone system to provide media content to a caller on-hold, the media player comprising:
    a storage medium configured to store at least two files of media content; and
    a controller in communication with said storage medium and said controller is configured to read said storage medium, and wherein said controller constructs a playlist based on a unique identifier name associated with each of the at least two files of media content wherein said controller is configured to create an order of execution for said playlist based on each of the unique identifier name associated with the at least two files of media content.

15. A media player capable of being integrated with a telephone system to provide media content to a caller on-hold, the media player comprising:
    a storage medium configured to store at least two files of media content; and
    wherein the at least two files of media content include a first file and a second file and wherein said controller is configured to switch between the first file and the second file after a predetermined amount of time of the output the first file; and
    wherein the at least two files of media content are each longer than the predetermined amount of time.

16. A media player capable of being integrated with a telephone system to provide media content to a caller on-hold, the media player comprising:
    a storage medium configured to store at least two files of media content each having a unique identifier name;
    a controller in communication with the storage media and wherein the controller is configured to output a current media file by switching between media files of the at least two files of media content based on the unique identifier names and after a predetermined amount of time has elapsed;
    a digital-to-analog converter in communication with the controller, and wherein the digital-to-analog converter converts the media content into an analog signal for output to a telephone; and an audio amplifier in communication with the digital-to-analog converter, and wherein the audio amplifier amplifies the analog signal to a suitable level for output to the audio output.

17. The media player of claim 16, wherein said at least two files of media content include at least one of a music selection and a sound effect selection, and at least one selected from the group consisting of a greeting, a voice announcement, and a priority announcement.

18. A media player system capable of being integrated with a telephone system to provide media content to a caller on-hold, the media player system comprising:
- at least one telephone;
- a structured wiring system in communication with said at least one telephone, and wherein the structured wiring system connects wiring corresponding to said at least one telephone to a structured wiring cable;
- a telephone system unit in communication with said structured wiring system via said structured wiring cable, and said telephone system unit is configured to route telephone calls to said at least one telephone; and
- a media player in communication with said telephone system unit, wherein said media player has a controller configured to construct a playlist based on a unique identifier name associated with at least two files of media content and wherein said controller is configured to create an order of execution for said playlist based on said unique identifier name associated with said at least two files of media content.

19. The media player system of claim 18, wherein the structured wiring system is one of a punch-down block and a patch panel.

20. The media player system of claim 18, wherein the structured wiring cable is a riser cable.

21. The media player system of claim 20, wherein the riser cable is a twenty-five pair riser cable.

22. The media player system of claim 18, further includes a plurality of telephone circuits in communication with the telephone system unit, and a telephone service provider in communication with the plurality of telephone circuits.

23. The media player system of claim 18, wherein the at least one telephone is a plurality of telephones.

24. A method of programming and using a media player configured to provide media content to a telephone system for calls having an on-hold status, said method comprising: assigning a unique identifier name to each of at least two media files; storing the at least two media files on the storage medium;
- constructing a playlist using the controller based on the unique identifier name of each of the at least two files of media content, and
- creating an order of execution for the playlist based on the unique identifier name associated with the at least two files of media content using the controller; and
- executing said playlist when a call is placed on-hold.

25. The method of claim 24, further including the step of: switching between the at least two files of media content via the controller after a predetermined amount of time.

26. The method of claim 25, wherein switching between at least two files of media content includes at least one of fading in and fading out of the first file and the second file.

27. The method of claim 24, further including the step of: detecting the storage medium capable of storing the at least two files of media content stored in a directory using the unique identifier name.

28. The method of claim 24, wherein the at least two files include a first file and a second file.

29. The method of claim 24, wherein one of the at least two files outputs at a given time.

30. The method of claim 24, further including the step of: detecting a user configured restart.

31. The method of claim 30, wherein detecting the user configured restart includes detecting the presence of the storage medium.

32. The method of claim 24, further including the step of: reprogramming the at least two files of media content stored on the storage medium.

33. The method of claim 32, wherein reprogramming the at least two files of media content includes at least one of adding another file of media content, deleting one of the at least two files of media content, and changing one of the at least two files of media content.

* * * * *